Sept. 6, 1966     W. E. REED     3,270,951
TURBOCHARGER CONTROLS

Filed April 4, 1963     2 Sheets-Sheet 1

INVENTOR
Wendell E. Reed

BY
ATTORNEYS

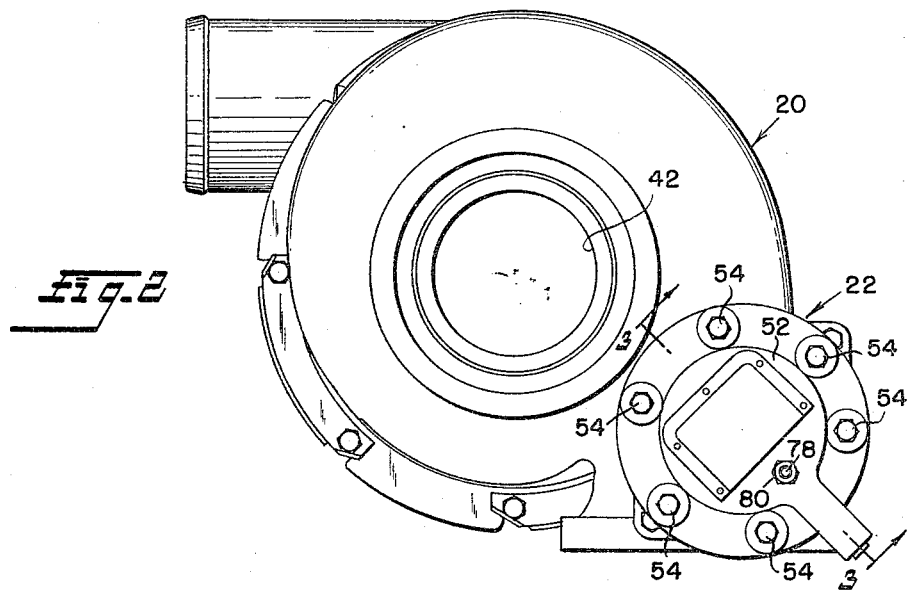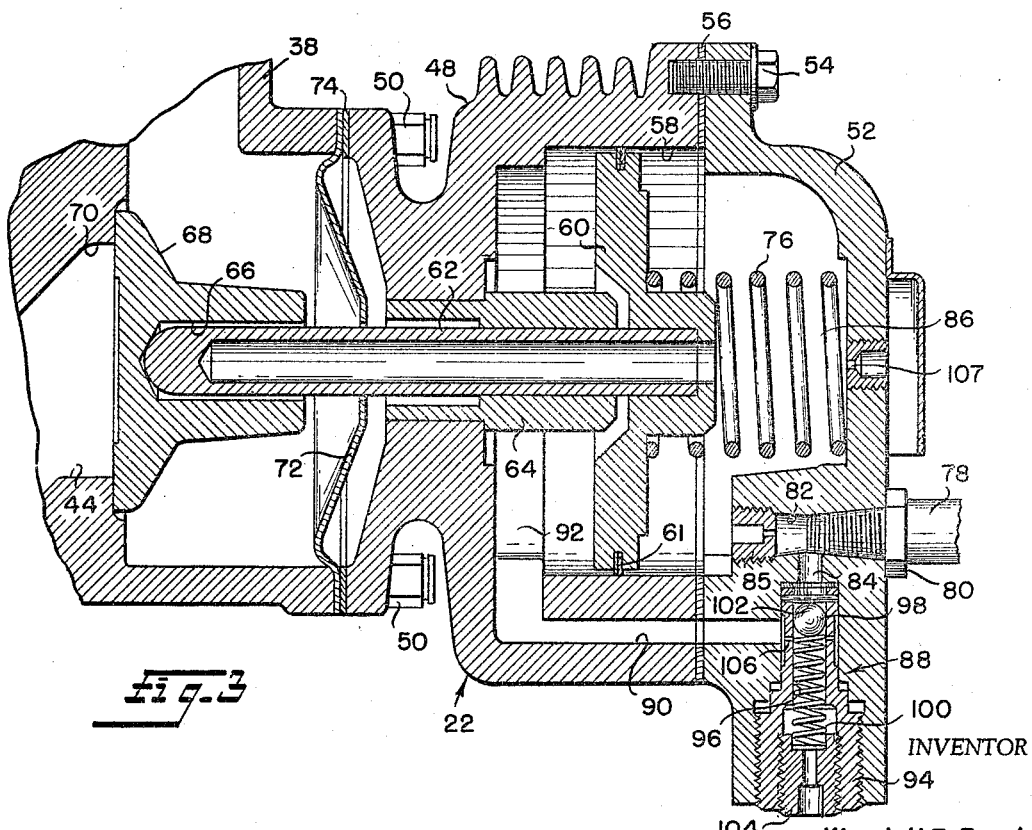

United States Patent Office 3,270,951
Patented Sept. 6, 1966

3,270,951
TURBOCHARGER CONTROLS
Wendell E. Reed, Chula Vista, Calif., assignor, by mesne assignments, to International Harvester Company, a corporation of Delaware
Filed Apr. 4, 1963, Ser. No. 270,646
5 Claims. (Cl. 230—9)

This invention relates to controls for superchargers and more particularly to such controls for exhaust driven superchargers for internal combustion engines commonly called turbochargers.

In such units the compressor is driven directly by a turbine driven by the engine exhaust gases and the amount of boost delivered by the compressor is thus a direct function of the pressure and quantity of the exhaust gas delivered to the turbine.

As a practical matter it is not feasible to size a turbocharger to meet exactly the requirements of a given internal combustion engine at all conditions. Accordingly, such turbochargers are so designed that when they operate at maximum capability they may deliver sufficient boost to exceed the design limits of the engine which can seriously damage or destroy the engine. Accordingly, the compressor discharge pressure or boost pressure must be closely controlled, i.e., sufficient pressurized air must be supplied to the engine to assure optimum performance but too much air will damage or destroy the engine.

In accordance with the present invention this control is achieved by providing a structurally simple control for a waste gate valve which maintains the desired degree of boost by automatically controlling the pressure of the engine exhaust gases applied to the turbocharger turbine. The control mechanism for the valve is so arranged that the valve is opened when the compressor discharge pressure reaches a critical figure allowing part of the engine exhaust to flow to ambient without acting on the turbocharger turbine.

Broadly, turbine waste gate controls are not new. However, prior proposals have generally suffered from one or more disadvantages, notably high cost and complexity, low sensitvity, sluggish response and lack of reliabiliay. Where simple, low cost controls have been proposed they have in general lacked the fast response and reliability which are esesntial for effective performance.

With these considerations in mind, it is a principal purpose and object of the present invention to provide improved turbocharger waste gate controls which are of relatively simple, rugged construction and yet which provide the speed of response, accuracy of control, and reliability required to assure optimum safe performance of the associated engine.

It also is an object of the present invention to provide improved turbocharger control units which are compact and lightweight and which may be incorporated in or with a turbocharger without materially increasing its overall dimensions.

Additional objects and advantages of the present invention will become apparent as the description proceeds in connection with the accompanying drawings in which:

FIGURE 2 is an end elevation of the assembly of FIGURE 1; and,

FIGURE 3 is an enlarged central section taken along line 3—3 of FIGURE 2.

Figure 1:
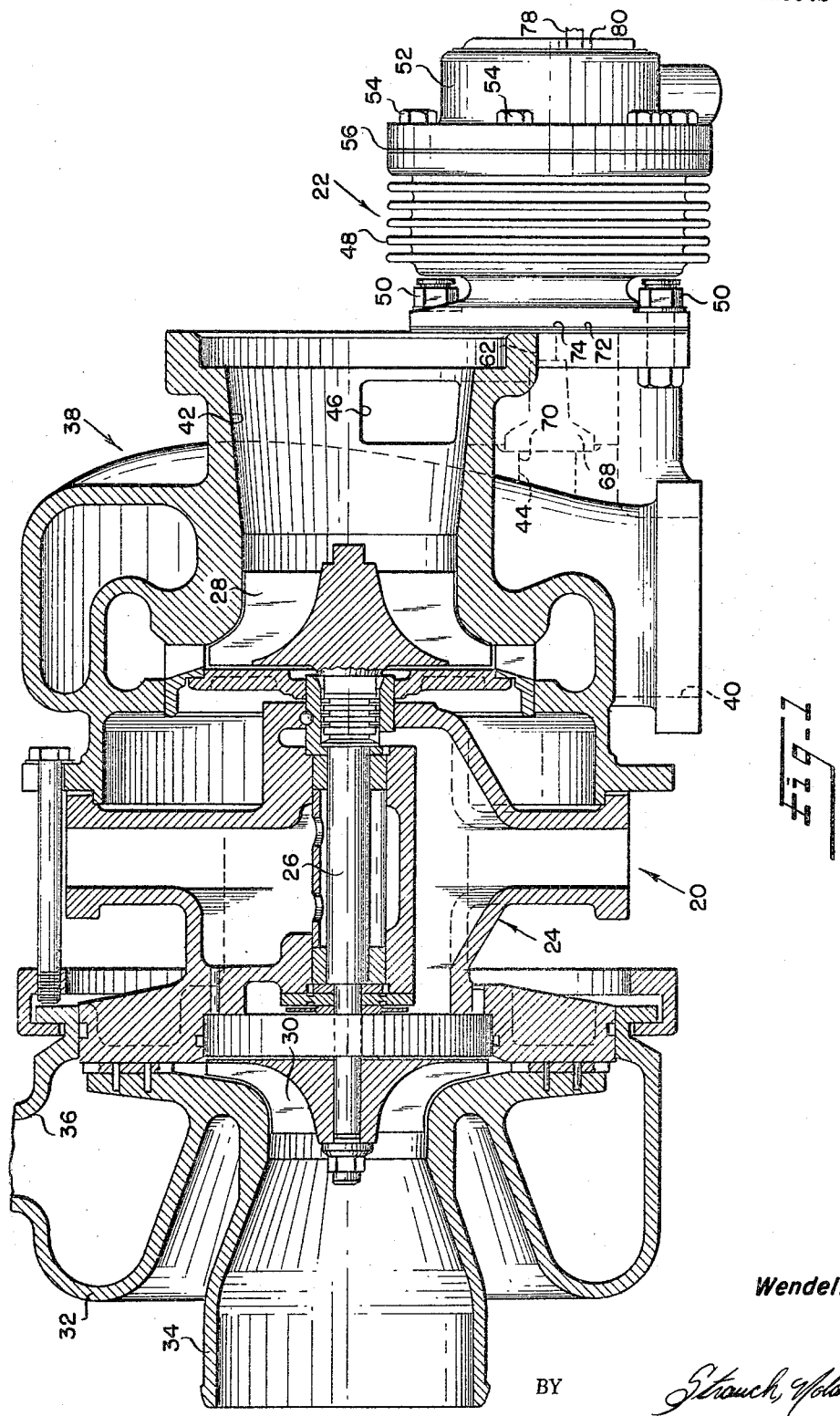
FIGURE 1 is a central vertical section of a typical turbocharger unit incorporating the waste gate control of the present invention.

Referring now more particularly to the drawings, FIGURES 1 and 2 illustrate a typical turbocharger unit indicated generally at 20 with which the waste gate control assembly 22 of the present invention may be used. The particular construction and configuration of the turbo compressor unit 20 may be widely varied. Accordingly, it will be described here only to the extent necessary to an understanding of the operation of the control unit 22.

The turbocharger unit 20 includes a central housing member 24 which supports a rotor shaft 26 carrying a turbine rotor 28 at one end and a compressor rotor 30 at the other rotor 30 at the opposite end, the latter rotating in a compressor scroll 32 having an inlet 34 connected to the atmosphere and an outlet 36 through which air is delivered to the engine to be turbocharged.

The turbine rotor 28 is received in a turbine scroll 38 having an inlet 40 connected to the exhaust manifold of the associated internal combustion engine and an outlet 42 leading to the atmosphere. The turbine scroll 38 is also provided with a by-pass passage 44 connecting the exhaust gas inlet passage 40 to an opening 46 in the outlet 42 leading directly to the atmosphere. The control unit of the present invention includes a waste gate valve for opening and closing the passage 44 as explained in detail below.

The control unit assembly 22 is enclosed in a cast housing 48 secured by bolts 50 directly to the turbine scroll 38. As shown in FIGURE 1 the housing is finned to dissipate heat to the atmosphere. The outer end of the housing is closed by a cover 52 held in place by studs 54, a sealing gasket 56 being provided between the parts. The hollow interior of the housing 48 and the cover 52 provide a chamber 58 in which a piston 60 having a peripheral metallic seal ring 61 is slidably received. The piston 60 is mounted on a hollow piston rod 62 slidably received in a guide member 64 press fitted into a reduced portion of the housing 48.

The inner end of the piston rod 62 is loosely received in a blind bore 66 in the waste gate valve member 68 which, as shown in FIGURE 3, normally closes a port 70 in the passage 44. The piston rod 62 also projects through a central opening in a thin sheet metal heat shield 72 which is peripherally clamped between the housing member 48 and the turbine scroll 38. To further impede heat transfer between the turbine scroll and the housing 48 an insulating gasket 74 is interposed between the periphery of the heat shield 72 and the housing 48. A coil spring 76, compressed between the cover member 52 and the piston 60, urges the latter and the valve 68 to the left as viewed in FIGURE 3 to hold the valve closed in the absence of fluid pressure. The position of the piston 60 and the valve 68 is also controlled by the application of opposed fluid pressures, one of which is based on the compressor discharge pressure. This pressure is conducted from the compressor scroll 32 through a conduit 78 which terminates in a fitting 80 threaded into an opening provided in the cover member 52. The inner end of the fitting is in communication with two passages 82 and 84, the former containing an orifice fitting 85 leading to a chamber 86 at the outer side of the piston 60. The passage 84 is in communication with the interior of a valve assembly indicated generally at 88 which is effective to connect a passage 90 leading to a chamber 92 at the inner side of the piston 60 to atmospheric pressure, to the compressor discharge pressure supplied through passage 84, or to an intermediate pressure.

The valve assembly 88 includes a fitting 94 threaded into the cover plate 52 and having a central through passage 96 which receives the ball 98 and a spring 100 which normally biases the ball against a pin 102 at the inner end of the fitting 94. The outer end of the spring 100 rests against a plug 104 which may be adjustably threaded into the outer end of the fitting 94 to adjust the force with which the ball is urged against the pin 102. The inner portion of the fitting 94 is provided with a plurality of radial openings 106 which connect the passage 96 with the passage 90. Thus when the ball 98 rests against the pin 102 it prevents fluid flow into the passage 96 from the pressure line 78 and connects chamber 92 through passage 90 and passage 96 to the amosphere. When the ball 98 is moved, under conditions to be described, to a position below parts 106 the compressor discharge pressure is connected to the chamber 92 through passages 82, 84, 96, 106, and 90. At any intermediate position the pressure is proportional to displacement.

When the internal combustion engine and the associated turbocharger are out of operation the components of the control mechanism will occupy the position shown in FIGURE 3 with the waste gate valve 68 closed by spring 76 and the valve 98 in its upper position. When the internal combustion engine is started and exhaust gases are supplied through the conduit 40 the turbine rotor begins to operate producing a rapid rise in the pressure at the compressor outlet which is delivered through conduit 78 and orifice 85 to the chamber 86 augmenting the force of spring 76.

It is to be particularly noted that the chamber 86 is not a static chamber. On the contrary there is a constant flow of air through this chamber regardless of the position of the waste gate valve 68. More specifically, air entering the chamber 86 through orifice 85 circulates in chamber 86 and may flow into and out of the interior of the hollow piston rod 62 and then passes through the exit orifice 107 in the cap.

Under these conditions a reference pressure will be established in the chamber 86 which is less than, but a predetermined function of, the compressor discharge pressure. The exact relation between the reference pressure in the chamber 86 and the compressor discharge pressure will be determined by the size and configuration of the orifice 85 and the exit orifice 107 which can readily be calibrated to produce a pressure of the desired value. In a typical case the diameter of the orifice in fitting 85 is .070" and is equal to that of the exit orifice 107.

Under normal operating conditions the force of the spring 76 plus the net force exerted on the piston 60 by the difference between the reference pressure in chamber 86 and ambient pressure in chamber 92 slightly exceeds the net force exerted by the exhaust gas on valve 68 thus holding the valve 68 in closed position. An increase in the pressure of the exhaust gases supplied to the turbine produces a corresponding increase in compressor pressure and in the reference pressure in chamber 86 and the net of all of the applied forces always acts in a valve-closing direction so long as ball 98 remains seated.

When the compressor discharge pressure passes the critical design point, as determined by the preload of the spring 100, it is effective to displace the ball 98 downwardly to increase the pressure in line 78 to the chamber 92. The increase in the pressure in chamber 92 results in a net force acting in a valve-opening direction. The valve 68 moves in the open direction allowing a portion of the exhaust gases to flow to ambient through the passage 44, the port 70 and the opening 46 thus slowing the turbine-compressor rotor. As the speed of the rotor decreases, the compressor discharge pressure decreases correspondingly and when the desired level of pressure is reached the ball 98 moves upward, reducing the pressure in the chamber 92 until a balance of forces acting on the valved piston is established. The valve 68 will remain in a partially open position until the compressor discharge pressure falls below the critical value.

It will be noted that the unit provides fast response upon either a pressure rise or a pressure decrease. For example, when the compressor discharge pressure exceeds its critical value by a small amount the ball 98 is immediately moved to a position to supply the full compressor discharge pressure to chamber 92 which in turn is immediately effective to open the valve 68. Similarly, when the pressure falls below the critical level the return of the ball 98 vents the chamber 92 which permits immediate return of the valve 68 to its closed position.

The longevity and reliability of the unit is due not only to the constant through flow of cooling air but also to the fact that it incorporates only one moving seal, the ring 61. Even this seal need not be absolutely pressure tight since a small amount of leakage across it will not adversely affect the operation of the unit.

The basic unit can be adapted for use with engines and turbochargers of widely varying capacity by substituting an orifice member 85 of proper size and by adjusting the size and action of the spring 100.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Control apparatus for a waste gate valve for a turbocharger having a turbine and a compressor comprising a piston connected to said valve, means forming inner and outer chambers at the sides of said piston adjacent and remote from said valve, respectively, means defining a restricted inlet connecting the compressor discharge pressure to said outer chamber, means defining a restricted outlet connecting said outer chamber to a low pressure area, said restricted inlet and outlet cooperating to establish a reference pressure in said outer chamber bearing a predetermined relation to the compressor discharge pressure, a spring biasing said piston in a valve-closing direction, the force of said spring plus the reference pressure normally holding said valve closed, and valve means normally venting said inner chamber, said valve means being responsive to an increase in the compressor discharge pressure to a predetermined level to connect said inner chamber to said compressor discharge pressure to overcome the force of said spring and said reference pressure to thereby open said waste gate valve.

2. Control apparatus for the waste gate valve of a turbocharger having a turbine and a compressor driven by said turbine comprising, a piston connected to said waste gate valve, means forming inner and outer chambers at the opposite sides of said piston adjacent and remote from said valve, respectively, an inlet orifice member connecting said outer chamber to the compressor discharge pressure, an outlet orifice member connecting said outer chamber to the ambient atmosphere, said orifices cooperating to establish a reference pressure in said outer chamber having a predetermined relation to the compressor discharge pressure, a spring biasing said piston in a valve closing direction, the force of said spring plus the reference pressure normally holding said waste gate valve closed, passage means connecting said inner chamber to the compressor discharge pressure and to the ambient atmosphere, and a check valve assembly in said passage, said check valve assembly being effective in a first position to connect said passage means to ambient atmosphere and to block communication between said passage means and said compressor discharge pressure and effective in a second position to connect said passage means to said compressor discharge pressure while blocking the connection between said passage means and the ambient atmosphere, said check valve assembly being spring biased to normally occupy said first position whereby said reference pressure and said spring maintain said waste gate valve closed, said check valve assembly being moved toward said second position upon a rise in compressor discharge pressure above a predetermined level whereby the compressor discharge pressure supplied to said inner chamber overcomes the force of said spring and said reference pressure to open said waste gate valve.

3. The combination according to claim 1 wherein said piston is connected to said waste gate by a piston rod loosely received in a bore in said waste gate valve.

4. The combination according to claim 3 wherein said piston rod is hollow and has one end opening into said outer chamber.

5. Control apparatus for the waste gate valve of a turbocharger having a turbine and a compressor driven by said turbine, comprising a piston connected to said waste gate valve, means forming inner and outer chambers at the opposite sides of said piston adjacent and remote from said valve, respectively, means defining a restricted inlet connecting the compressor discharge pressure to said outer chamber, means defining a restricted outlet connecting said outer chamber to a low pressure area, said restricted inlet and outlet cooperating to establish a reference pressure in said outer chamber having a predetermined relation to the compressor discharge pressure, a spring biasing said piston in a valve-closing direction, the force of said spring, plus the reference pressure normally holding said waste gate valve closed, a control valve assembly effective in a first position to connect said inner chamber to ambient pressure and effective in a second position to connect said inner chamber to said compressor discharge pressure, said control valve being constructed and arranged to normally occupy said first position whereby said reference pressure and said spring maintain said waste gate valve closed, and said control valve being moved toward said second position upon a rise in said compressor discharge pressure above a predetermined level to connect said inner chamber to said compressor discharge pressure to overcome the force of said spring and said reference pressure to thereby open said waste gate valve.

References Cited by the Examiner
UNITED STATES PATENTS

| | | | |
|---|---|---|---|
| 1,229,726 | 6/1917 | Ebeling | 137—489.5 |
| 1,704,403 | 3/1929 | Nash | 137—25 |
| 2,059,649 | 11/1936 | Pfau | 137—25 |
| 2,639,725 | 5/1953 | Albright | 103—42 |
| 2,646,812 | 7/1953 | Rheingans et al. | 137—25 |
| 2,778,312 | 1/1957 | Suttle | 103—17 |
| 3,035,408 | 5/1962 | Silver | 60—13 |
| 3,102,382 | 9/1963 | Bozzola | 60—13 |
| 3,104,520 | 9/1963 | Cazier et al. | 60—13 |
| 3,150,814 | 9/1964 | Evans | 230—9 |

MARK NEWMAN, *Primary Examiner.*

LAURENCE V. EFNER, DONLEY J. STOCKING,
*Examiners.*

W. L. FREEH, *Assistant Examiner.*